United States Patent Office 2,959,595
Patented Nov. 8, 1960

2,959,595

4,4'-THENYLIDENE BIS PHENOLS

David J. Beaver, Richmond Heights, Mo., and Richard O. Zerbe, Nitro, W. Va., assignors to Monsanto Chemical Company, St. Louis, Mo., a corporation of Delaware No Drawing. Filed Dec. 16, 1957, Ser. No. 702,780

2 Claims. (Cl. 260—332.3)

This invention relates to a new and novel family of thenylidene bis phenols. More particularly, it relates to 4,4'-thenylidene bis phenols derived by condensing thiophenaldehyde with disubstituted phenols containing an alkyl group of at least four carbon atoms in the 2-position and an alkyl group in the 5-position and to their manufacture.

The new compounds may be represented by the general formula

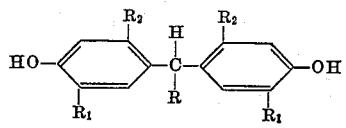

where R is a thienyl group, $R_1$ is an alkyl group of at least four but not more than twelve carbon atoms and $R_2$ is a lower alkyl group.

Dialkyl phenols suitable as starting materials for the preparation of the new compounds may be prepared by a variety of methods, however the position of the alkyl groups exerts a profound influence on the antioxidant properties and it is essential to employ phenols having the proper orientation of the alkyl groups. Exemplary of one suitable class of dialkyl phenols are the products prepared by alkylating a meta or 3-alkyl substituted phenol with a tertiary alcohol or olefin in the presence of sulfuric acid or phosphoric acid catalyst. This affords a convenient direct synthesis and the published evidence indicates that under these conditions the alkyl group enters the 6-position. In any event this class of products have proven to be satisfactory. Other methods of synthesis are equally well known and available for the introduction of normal alkyl groups. Examples of suitable dialkyl phenols together with their physical properties are listed below:

6-tert. butyl m-cresol, B.P. 130° C./20 mm.
2-tert. butyl 5-ethyl phenol, B.P. 135–138° C./20 mm.
6-tert. amyl m-cresol, B.P. 133–137° C./20 mm.
6-n-butyl m-cresol, B.P. 134° C./15 mm.
2-n-butyl 5-ethyl phenol, B.P. 119–121° C./4 mm.
6-iso amyl m-cresol, B.P. 104–106° C./2 mm.
6-n-hexyl m-cresol, B.P. 118–119° C./2.5 mm.
6-isohexyl m-cresol, B.P. 108–109° C./1.5 mm.
6-n-heptyl m-cresol, B.P. 126–128° C./2.5 mm.
6-n-octyl m-cresol, B.P. 141–143° C./3 mm.
6-n-decyl m-cresol, B.P. 146–147° C./2 mm.
6-n-dodecyl m-cresol, B.P. 183° C./3 mm. (M.P. 44° C.)

Still further examples of suitable 2,5-dialkyl phenols are 6-sec. butyl m-cresol, 6-(2,4-dimethyl butyl) m-cresol, 6-sec. amyl m-cresol, 6-sec. octyl m-cresol and 2,5-di-tert. butyl phenol.

The condensation of the phenol and the aldehyde is usually carried out in a molar proportion of 2:1 in the presence of an acidic condensation catalyst, as for example, hydrochloric acid. Where desired solvents and/or dispersing mediums may be employed although the reactions are actually carried out in the absence of either. The following illustration is the preparation of the new compounds.

A half gram mole of the appropriate phenol and one-fourth gram mole of the aldehyde were refluxed in the presence of 4.7 grams of concentrated hydrochloric acid. The mixtures were refluxed at 95° C. The reaction times varied, these being determined by spot testing at intervals with a solvent or precipitant consisting chiefly of heptenes and quenching the reaction when crystal formation was observed and before sufficient resin was formed to interfere with purification of the crystals. The reaction mixture was cooled and thereto was added 100 ml. of heptane. The mass was stirred for 4 hours at 30–32° C. and the product filtered off, washed with several portions of the aforesaid hydrocarbon and subsequently dried. In this manner was obtained 4,4'-thenylidene bis(6-tert. butyl m-cresol), white solid, from heptane, M.P. 223.3–223.7° C. from 2-thiophenaldehyde and 6-tert. butyl m-cresol, reaction time 15 minutes. Carbon found 76.68%, calc. 76.75%. Hydrogen found 8.41%, calc. 8.11%. Sulfur found 7.64%, calc. 7.57%.

As illustrative of the antioxidant properties duplicate rubber base stocks were compounded comprising:

| | Parts by weight |
|---|---|
| Pale crepe rubber | 100.0 |
| Zinc oxide | 60.0 |
| Lithopone | 20.0 |
| Sulfur | 2.0 |
| Diphenyl guanidine phthalate | 0.825 |
| Benzothiazyl thio benzoate | 0.675 |
| Paraffin | 0.25 |

To one base stock was added 1.0 part by weight of antioxidant. The respective stocks were cured in the usual manner by heating in a press at 126° C. for 45 and 60 minutes. The compounds were then aged by heating in a bomb at 70° C. under a pressure of 300 pounds oxygen per square inch. The data below show the percent retention of ultimate tensile strength obtained after aging for 216 hours. The second column shows the resistance to discoloration. Samples of the cured stocks were exposed under an S-1 sunlamp for 10 days. After exposure the light reflected from the surface of the stocks was measured by means of a Photovolt Reflectance Meter calibrated against reflectance of standard MgO as 100%. The data shown are percent reflectance of the 60 minute cures. The tensile and reflectance data are both for the 60 minute cures.

Table I

| Antioxidant | Tensile Retained, Percent | Light Reflectance, Percent |
|---|---|---|
| None | 68 | 69 |
| 4,4'-Thenylidene bis (6-tert. butyl m-cresol) | 80 | 66 |

The new chemicals are soluble in synthetic rubber as well as natural rubber and for most preservative purposes 0.1% to 2.5% on the rubber has been found satisfactory, however, amounts outside this range may be employed where desired.

This application is a continuation-in-part of co-pending application Serial No. 253,474, filed October 26, 1951, and now abandoned.

What is claimed is:
1. As a new composition of matter a compound of the structure

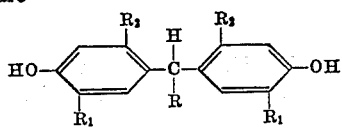

where R represents thienyl, $R_1$ represents alkyl containing at least four but not more than twelve carbon atoms and $R_2$ represents lower alkyl.

2. 4,4'-thenylidene bis(6-tert. butyl m-cresol).

References Cited in the file of this patent
UNITED STATES PATENTS

| | | |
|---|---|---|
| 2,559,932 | Briggs | July 10, 1951 |
| 2,822,404 | Amberlang | Feb. 4, 1958 |

OTHER REFERENCES

Faith: J. Am. Chem. Soc., vol. 72, pp. 873–839, February 1950.